UNITED STATES PATENT OFFICE.

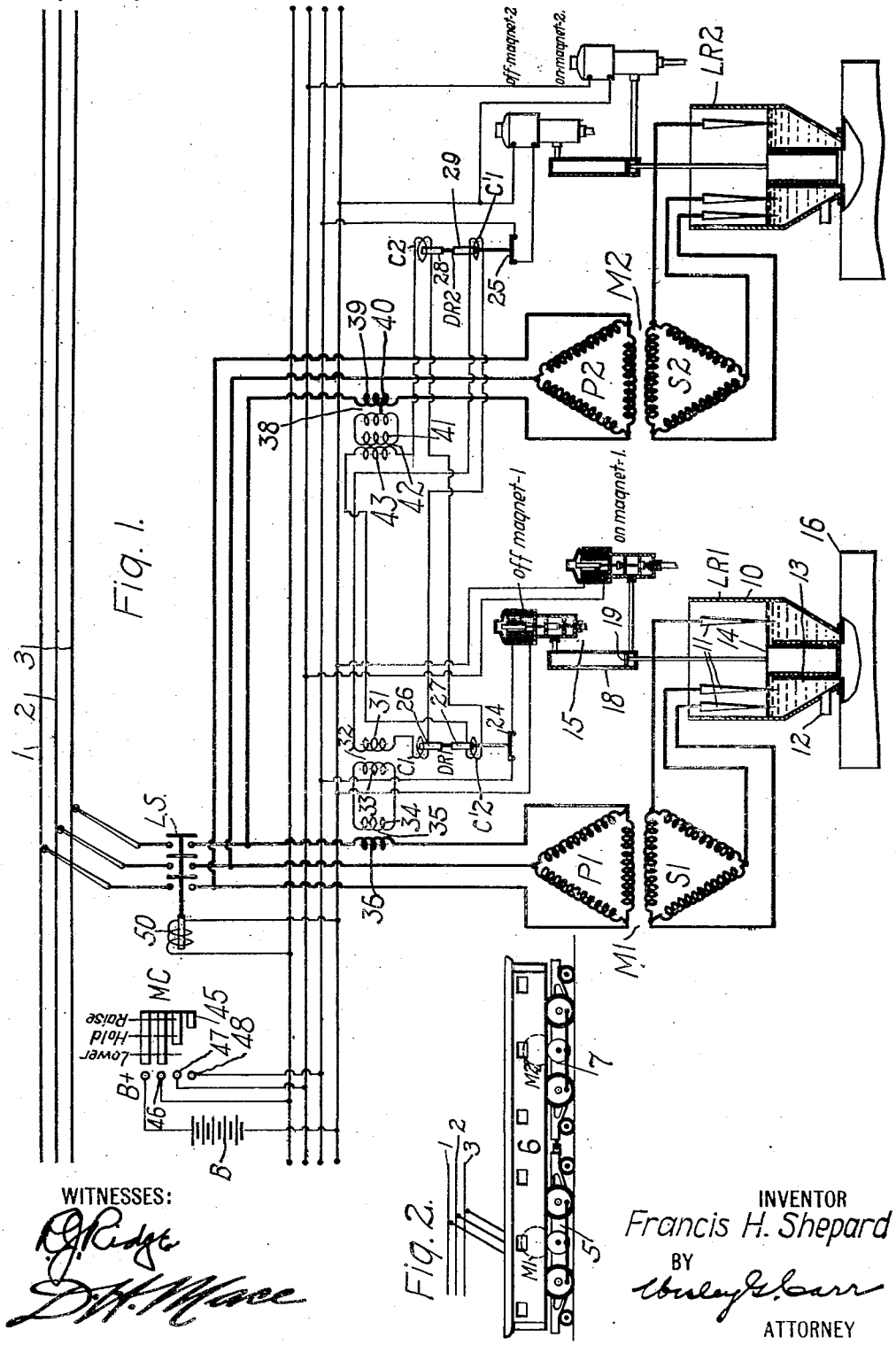

FRANCIS H. SHEPARD, OF NEW ROCHELLE, NEW YORK, ASSIGNOR TO WESTINGHOUSE ELECTRIC AND MANUFACTURING COMPANY, A CORPORATION OF PENNSYLVANIA.

CONTROL SYSTEM.

1,236,774.      Specification of Letters Patent.      Patented Aug. 14, 1917.

Application filed July 24, 1914. Serial No. 852,799.

*To all whom it may concern:*

Be it known that I, FRANCIS H. SHEPARD, a citizen of the United States, and a resident of New Rochelle, in the county of Westchester and State of New York, have invented a new and useful Improvement in Control Systems, of which the following is a specification.

My invention relates to control systems for dynamo-electric machines, and it has special reference to the regulation of such polyphase induction motors as are employed for propelling electric locomotives or other electric vehicles.

One of the objects of my invention is to provide a system for controlling the driving units or motors of an electric locomotive or train of electric vehicles in such manner that a predetermined division of the load between the driving units shall be maintained at all times, irrespective of variations in the electrical characteristics of the motors or in the operation of the governing devices, or in the differences in diameters of the driving wheels.

More specifically, it is the object of my invention to provide automatic means for proportioning the total load between a plurality of motor-driven units which may constitute a plurality of separate motor-driven axles, a plurality of motor-driven trucks or a plurality of half units constituting an electric locomotive.

It has been customary in the past to provide means for equalizing the loads among a plurality of induction motor-driven units by rendering the operation of all of the motors but one, dependent upon the operation of the remaining motor, or by balancing the several motors against a manually controlled auxiliary device, whereby the loads have been maintained substantially equal under all conditions of service.

According to my invention, however, I propose to accomplish the desired results by employing a plurality of differential relays which are severally associated with each of the driving units to be manipulated, and each of which is provided with auxiliary coils that are severally influenced by the current traversing the respective motors. Thus, automatic equalization of the load is obtained by mutually balancing each of the driving units against the other.

For the sake of simplicity, I shall set forth my invention as embodying a pair of polyphase induction motors that are governed by separate electrically controlled liquid rheostats, the system being of the multiple unit type. In the case exemplified, the motors are associated, one with each truck of a single locomotive, although it is clear that a pair of motors for each truck may be balanced, or, that two half units of a locomotive may be similarly adjusted.

In the accompanying drawing, Figure 1 is a diagrammatic view of a system of control embodying my invention, and Fig. 2 is a view, in elevation, of an electric locomotive for the control of which my invention is adapted.

Referring to the drawing, a plurality of polyphase supply circuit conductors 1, 2 and 3 are adapted to deliver energy, through a line switch LS, to the primary winding P1 and P2 of a pair of polyphase induction motors M1 and M2 that are respectively provided with secondary windings S1 and S2 having connections to a plurality of liquid rheostats LR1 and LR2, respectively.

The motor M1 is associated with a driving truck 5 of a locomotive 6 having another driving truck 7 which is propelled by motor M2, said trucks 5 and 7 having an articulated connection, in the usual manner.

The liquid rheostats LR1 and LR2 are of like construction and each comprises a tank 10, a plurality of electrodes 11, an inlet opening 12, a centrally disposed stationary discharge tube 13, a regulating valve 14, also of tubular form and adapted to be raised and lowered within the member 13, and an electrically controlled pneumatic operating mechanism 15 for governing the actuation of the regulating valve 14. Suitable means (not shown) is provided for effecting a continuous circulation of electrolyte through the rheostat tank 10, whereby the minimum level of electrolyte is always maintained at a height corresponding to the upper end of the discharge tube 13, at which height the ends of the electrodes 11 are partially immersed. The excess of electrolyte is discharged through the regulating valve 14 into a main reservoir 16.

The operating mechanism 15, termed the "balanced pressure operating mechanism," comprises a cylinder 18 having an "off magnet" valve associated with its upper end and adapted to control the admission of an operating fluid thereto, and an "on magnet" valve associated with its lower end and adapted to govern the admission of operating fluid to the lower end of the cylinder. The cylinder is also provided with a movable piston 19 which is mechanically connected to the regulating valve 14. Thus, the regulating valve 14 may be raised and lowered to fix the level of the electrolyte, and, consequently, to regulate the amount of secondary resistance in the windings of the motor which it is adapted to control.

The "off magnet" valve, when deënergized, is opened to admit operating fluid to the cylinder 18, while the "on magnet" valve is closed under similar conditions and establishes a communication between the lower end of the cylinder 18 and the atmosphere. Initially, therefore, the regulating valve 14 is held in its lowest position, inasmuch as the pressure above the piston 19 tends to force it to its lowest point of travel.

It will be understood, that, if the "on magnet" valve is also opened, balanced pressures acting upon the opposite sides of the piston 19 will result, thereby holding said piston in whatever position it occupies, while, if both the "off magnet" valve and the "on magnet" valve are energized, pressure is released from above the piston 19 and admitted beneath it, whereby the unbalanced pressure relation effects an upward movement of said piston and associated regulating valve 14. For purposes of distinction, hereinafter the "off magnet" and the "on magnet" valves associated with the rheostat LR1 will be designated by employing the numeral 1 after their respective names, while the corresponding valves associated with rheostat LR2 will be followed by the numeral 2, as "on magnet—1."

In order to provide for balancing the loads or torques between the several motors, I employ a plurality of differential relays DR1 and DR2 that are respectively provided with movable switch members 24 and 25 which are respectively adapted to make and break the energizing circuits of "off magnet—1" and "off magnet—2." The differential relay DR1 embodies a plurality of cores 26 and 27, which might conveniently constitute a single member, and a plurality of energizing coils C1 and C'2 which are so disposed with respect to the cores 26 and 27 and so connected as to act in opposition, the one to the other. The differential relay DR2 similarly embodies a plurality of cores 28 and 29 and coils C2 and C'1.

The coil C1 of relay DR1 and C'1 of relay DR2 are connected in series across a secondary winding 31 of a shunt transformer 32 having a primary winding 33 that is energized from a secondary winding 34 of a series transformer 35 having its primary winding 36 connected in series circuit with one of the conductors between motor M1 and the line switch LS. A series transformer 38 has its primary winding 39 connected in series with a corresponding conductor between the motor M2 and switch LS, and said transformer is provided with a secondary winding 40 which serves to energize a winding 41 of an auxiliary shunt transformer 42 having its secondary winding 43 connected to energize the coils C'2 of relay DR1 and coil C2 of relay DR2 which are connected in series circuit.

The operation of the system is manually controlled by a master controller MC which embodies a movable conducting segment 45 and a plurality of stationary contact terminals B+, 46, 47 and 48 which are adapted for coöperative engagement upon the position - indicating lines marked "Lower," "Hold" and "Raise."

Assuming the apparatus and circuit connections to be as shown, the operation of the system is as follows:

The master controller MC is first moved into its position marked "Raise," whereby a circuit is completed from the positive side of an auxiliary battery B which includes terminal B+, segment 45, terminal 46, energizing coil 50 of line switch LS to the negative side of the battery B; another circuit is completed from the terminal B+ which includes segment 45, terminal 47 and the energizing coils of "on magnet—1" and "on magnet—2," in parallel relation, to the negative side of the battery; while still another circuit is established from contact terminal B+, through segment 45, terminal 48, and thence through switch member 24 of relay DR1 and energizing coil of "off magnet—1" to the battery and a multiple circuit through switch member 25 of relay DR2 and "off magnet—2" to the battery.

The energization of coil 50 effects the closure of the line switch LS, whereby energy is delivered from the supply circuit conductors 1, 2 and 3 through switch LS and, thence, in parallel, to primary motor windings P1 and P2 of the respective motors M1 and M2. The motors are thus started into operation.

Upon the completion of the circuits through the energizing coils of the various magnet valves associated with the respective balanced - pressure operating mechanisms, said valves are actuated, whereby pressure is released from above the pistons 19, and operating fluid is admitted beneath said pistons. Under these conditions of unbalanced-pressure, the several pistons 19 and their associated regulating valves 14 are moved upwardly until the movement is arrested, either by the operator or through the agency of the differential relays DR1 and DR2, as will be hereinafter explained.

For instance, if the level of the electrolyte within the several rheostats LR1 and LR2 has been raised sufficiently to bring the motors M1 and M2 to the desired speed, the operator may move the master controller MC to its intermediate position marked "Hold". In so doing, contact terminal 48 becomes disengaged from conducting segment 45 of the master controller MC and the energizing circuits through the "off magnet—1" and the "off magnet—2" are interrupted. The several "off magnet" valves, therefore, are permitted to open to admit operating fluid above the pistons 19, whereby balanced-pressures act upon the pistons 19 which hold the regulating valves 14 at rest.

If, during the acceleration of the motors, motor M1 should, for any reason whatsoever, have a tendency to take the larger portion of the load, or at least a portion greater than its intended amount, an excessive current traverses the primary winding 36 of the series transformer 35, which, through the interposition of the auxiliary shunt transformer 32, concurrently and similarly influences the coil C1 of relay DR1 and C'1 of relay DR2. Coil C1, therefore, predominates over coil C'2 of relay DR1 and coil C'1 overbalances coil C2 of relay DR2. Hence, relay DR1 is caused to raise its switch member 24 to interrupt the energizing circuit of "off magnet—1", while the energizing circuit of "off magnet—2" is maintained intact. The deënergization of "off magnet—1" permits said magnet valve to open to establish balanced pressure conditions within the cylinder 18, whereby further movement of the regulating valve 14 of rheostat LR1 is prevented.

It is evident, therefore, that the operation of rheostat LR2 continues undisturbed while the operation of rheostat LR1 is arrested. Rheostat LR2, therefore, serves to exclude more resistance from the secondary windings S2 of motor M2 causing said motor to increase its load until the desired division of total load is again obtained, when the opposing coils of the respective relays DR1 and DR2 neutralize each other and permit the closure of relay DR1, whereby "off magnet—1" is again energized, and the upward movement of the regulating valve 14 and the electrolyte level of rheostat LR1 are resumed.

Obviously, in case motor M2 has a tendency to carry more than its intended share of the load, differential relay DR2 is raised to arrest further movement of rheostat LR2, while relay DR1 is held closed to permit rheostat LR1 to increase the load on motor M1 until the desired equalization or division of load is secured.

The motors M1 and M2, therefore, are adapted to proportion the load in accordance with predetermined conditions and are mutually dependent, one on the other, for automatic adjustment thereof.

As already pointed out, the differences in motor operation with respect to their tendency to carry load may be the result of differences in construction and electrical characteristics of the motors themselves, or of the balanced pressure operating mechanisms which govern the liquid rheostats, or, perhaps, may be due to differences in densities of the electrolyte employed or in the rate of its flow, although differences in diameters of driving wheels are, perhaps, the most common and troublesome. By means of my invention, therefore the mutual interdependence of the motors insures the proper division of load under all service conditions.

The particular means for controlling the operation of the several rheostats through the agency of the master controller forms no part of my invention, except as it performs a necessary function in the operation of the system, and, therefore, no further detailed description thereof will be given, it being understood, of course, that, if the master controller MC be moved to its position marked "Lower", the several "on magnet" valves are also deënergized, whereby the respective balanced-pressure operating mechanisms are moved downwardly to lower the level of the electrolyte within the several rheostats.

My invention, broadly considered, resides in the means for mutually balancing the load between a plurality of driving units, whether they be separate motors, motor-driven driving trucks, locomotive units, or a plurality of electrically driven cars or vehicles. I, therefore, desire that only such limitations shall be imposed as are indicated in the appended claims.

I claim as my invention:

1. In a control system, the combination with a plurality of electric motors adapted to drive a common load, of similar electro-responsive means associated with each motor for automatically regulating the operation of said motor in accordance with relative current conditions of all of said motors throughout the entire accelerating operation.

2. In a control system, the combination with a plurality of electric motors adapted to drive a common load, of similar differential means energized in accordance with the current traversing each motor for rendering the operation of said motors mutually dependent throughout the entire accelerating operation.

3. In a control system, the combination with a plurality of driving units, of mutual means including differential relays energized in accordance with the current traversing each unit for proportioning the load between said units throughout the entire accelerating operation.

4. In a control system, the combination with a plurality of electric driving units working on a common load, of means for governing the operation of said units, and differential relays coöperating with each of said governing means for effecting a division of the load in accordance with mutual load conditions of said units.

5. The combination with a plurality of electrically propelled units for driving a common load, and means for separately governing the operation of said units, of similar means coöperating with each governing means and dependent upon predetermined current conditions of all of said units for effecting the operation of said governing means throughout the entire accelerating operation.

6. The combination with a plurality of electrically propelled units for driving a common load, and means for separately governing the operation of said units, of differential relays severally associated with each of said governing means and adapted to be influenced by the loads of both of said driving units for effecting a predetermined division of the load between driving units.

7. The combination with a plurality of driving units propelled by induction motors, and a plurality of liquid rheostats for severally governing said driving units, of differential relays associated with each of said rheostats and each having a plurality of coils severally influenced by the currents of each of said driving units for mutually and automatically controlling the operation of said rheostats.

8. The combination with a plurality of driving units propelled by electric motors, and electro-pneumatic means for separately governing the operation thereof and severally embodying electrically operated valves for controlling the operation of said electro-pneumatic means, of a plurality of differential relays severally adapted to control the action of said valves and each having coils respectively connected to be influenced by the load currents of said driving units.

9. The combination with a plurality of electric driving units associated with a common load, means for separately governing the operation of said units and a differential relay associated with each of said governing means, of means responsive to current conditions associated with each driving unit and severally adapted to influence the action of both of said differential relays.

10. The combination with a plurality of driving units propelled by electric motors and electro-pneumatically actuated liquid rheostats for separately governing the operation thereof and severally embodying electrically operated valves for controlling the operation of said electro-pneumatically actuated rheostats, of a plurality of differential relays severally adapted to control the action of said valves, and a plurality of current transformers severally connected in circuit with the respective electric motors and adapted to supply energization to both of said differential relays under predetermined load conditions upon the respective electric motors.

In testimony whereof, I have hereunto subscribed my name this 9th day of July, 1914.

FRANCIS H. SHEPARD.

Witnesses:
Wm. H. Capel,
C. Wesley Pomeroy.